(12) United States Patent
Borghetti et al.

(10) Patent No.: US 8,479,047 B2
(45) Date of Patent: Jul. 2, 2013

(54) PREDICTIVE MONITORING WITH WAVELET ANALYSIS

(75) Inventors: Stefano Borghetti, Viterbo (IT);
 Gianluca Della Corte, Naples (IT);
 Leonida Gianfagna, Rome (IT);
 Antonio Perrone, Rome (IT); Antonio M Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/531,565

(22) Filed: Jun. 24, 2012

(65) Prior Publication Data

US 2012/0297252 A1 Nov. 22, 2012

Related U.S. Application Data

(63) Continuation of application No. 12/754,961, filed on Apr. 6, 2010.

(30) Foreign Application Priority Data

Jul. 20, 2009 (EP) .................................. 09165910

(51) Int. Cl.
 *G06F 11/00* (2006.01)
(52) U.S. Cl.
 USPC .......................................................... 714/25
(58) Field of Classification Search
 USPC .................................................. 714/47.1, 25
 See application file for complete search history.

(56) References Cited

U.S. PATENT DOCUMENTS

| | | | | |
|---|---|---|---|---|
| 5,748,882 A * | 5/1998 | Huang | .......................... | 714/47.3 |
| 6,112,136 A * | 8/2000 | Paul et al. | ...................... | 700/293 |
| 6,564,174 B1 * | 5/2003 | Ding et al. | ..................... | 702/186 |
| 6,577,770 B1 * | 6/2003 | Martin et al. | .................. | 382/240 |
| 6,629,266 B1 * | 9/2003 | Harper et al. | ................. | 714/38.1 |
| 6,643,614 B2 * | 11/2003 | Ding et al. | ..................... | 702/186 |
| 7,020,569 B2 * | 3/2006 | Cao et al. | ....................... | 702/108 |
| 7,228,240 B2 * | 6/2007 | Duron et al. | ..................... | 702/34 |
| 7,788,536 B1 * | 8/2010 | Qureshi et al. | ............. | 714/38.14 |
| 7,865,888 B1 * | 1/2011 | Qureshi et al. | ................ | 717/168 |
| 7,870,550 B1 * | 1/2011 | Qureshi et al. | ................ | 717/174 |
| 7,900,201 B1 * | 3/2011 | Qureshi et al. | ................ | 717/174 |
| 7,996,814 B1 * | 8/2011 | Qureshi et al. | ................ | 717/120 |
| 8,117,227 B2 * | 2/2012 | Montangero et al. | ......... | 707/769 |
| 8,169,481 B2 * | 5/2012 | Ozdemir et al. | .............. | 348/155 |
| 2003/0006915 A1 * | 1/2003 | Kauppila et al. | .............. | 340/999 |
| 2003/0040878 A1 * | 2/2003 | Rasmussen et al. | ............ | 702/85 |
| 2005/0060702 A1 * | 3/2005 | Bennett et al. | .................... | 718/1 |

(Continued)

FOREIGN PATENT DOCUMENTS

EP 1253526 A1 10/2002

*Primary Examiner* — Kamini Patel
(74) *Attorney, Agent, or Firm* — North Shore Patents, P.C.; Michele Liu Baillie; Lesley A. Leonessa

(57) ABSTRACT

A computer implemented method, computer program product and system for monitoring a plurality of hardware or software system resources for identifying hidden trends in the behavior of the system resources, includes: collecting metrics of at least one system resource indicative of the behavior of at least one system resource; for each of the at least one system resource, determining a spectrum representative of a time-based signal of the collected metrics; performing a wavelet transform on each of the at least one spectrum; and analyzing the result of the wavelet transform to identify possible linear trends in the behavior of the at least one system resource.

20 Claims, 8 Drawing Sheets

U.S. PATENT DOCUMENTS

| | | |
|---|---|---|
| 2005/0076113 A1* | 4/2005 | Klotz et al. ............... 709/224 |
| 2005/0096873 A1* | 5/2005 | Klein ....................... 702/184 |
| 2005/0125197 A1 | 6/2005 | Duron et al. |
| 2005/0197805 A1 | 9/2005 | Eryurek et al. |
| 2005/0197806 A1 | 9/2005 | Eryurek et al. |
| 2006/0064291 A1* | 3/2006 | Pattipatti et al. ............ 703/14 |
| 2009/0037117 A1* | 2/2009 | Cheng ....................... 702/20 |
| 2009/0276705 A1 | 11/2009 | Ozdemir et al. |
| 2010/0114528 A1 | 5/2010 | Schipperijn et al. |

\* cited by examiner

PREDICTIVE MONITORING WITH WAVELET ANALYSIS

CROSS-REFERENCE TO RELATED APPLICATIONS

The present application is a continuation of co-pending U.S. patent application Ser. No. 12/754,961, filed on Apr. 6, 2010, which in turn claims priority to European Patent Application No. 09165910.2, filed on Jul. 20, 2009.

BACKGROUND

1. Technical Field

The present invention relates to the field of data processing systems, and more particularly to a method, computer program product, and system for predictive system monitoring.

2. Background of Invention

Applications for monitoring data processing systems play a key role in their management. For example, those applications are used to detect any critical condition in the system (so that appropriate corrective actions can be taken in an attempt to remedy the situation). For this purpose, selected performance parameters of the system (such as processing power consumption, memory space usage, bandwidth occupation, and the like) are measured periodically. The information so obtained is then interpreted (for example, according to a decision tree) so as to identify any critical condition of the system. For example, the occurrence of a low response time of the system can be inferred when both the processing power consumption and the memory space usage exceeds corresponding thresholds values.

Traditional monitoring applications are normally configured with predefined corrective actions, which are launched in response to the detection of corresponding critical conditions. These applications are event based, i.e. they react to events, e.g. a metric threshold's being exceeded within intervals being decided by users.

A drawback of the solutions described above is that they can only be used to recover the correct operation of the system. Indeed, the corrective actions are executed when any problem has become severe and the system cannot continue working properly. Therefore, those solutions are completely ineffective in preventing the occurrence of the problems in the system.

With this sort of traditional approach the notification is issued only when a problem occurs, while it would be desirable to anticipate the problems by predicting what is going to happen.

For this reason predictive monitoring applications have been developed which are structured in order to be able to anticipate problem occurrence under certain conditions. The usual way to realize a predictive approach is to tune and define multiple thresholds in order to generate multiple conditions for the same area of interest. This produces notifications with increasing severities resulting in alerts which occur before a critical event takes place. Examples of prior art predictive monitoring system can be found e.g. in IBM® Tivoli® Performance Analyzer of International Business Machines Corp, a software product that is able to generate predictive alerts based on linear analytic computations.

A drawback of existing predictive monitoring systems is that they do not normally take into account how fast a possible critical situation is approaching when asserting severity of the predicted problem. However this information (the speed) can be crucial. information when ranking a situation to dispatch resolution resources. In fact a situation approaching its critical status very fast is more serious and should be addressed before another situation that maybe is approaching the critical status relatively slowly, even if the latter is in a worse current status. It would be desirable to have a monitoring and events management system which determines the severity of a possible problem also considering the speed of approach of the problem. To achieve this we would need to isolate trends which may be hidden by transient effects. Given a system where a typical monitoring solution is implemented (metrics sampling), it is possible to use the last n samples for predictive analysis, by representing them as a discrete signal. The usual techniques for signal analysis use Fourier analysis which breaks down a signal into constituent sinusoids of different frequencies. Another way for describing Fourier analysis is as a mathematical technique for transforming our view of the signal from time-based to frequency-based representation. In a real system, several metrics are not flat, but they could be affected by noise in terms of large and quick variations even if the system is globally stable. Indeed the variations might not highlight any problems, but could depend on the normal system activity. In a similar scenario Fourier analysis has a serious drawback: the most interesting signals contain several non-stationary or transitory characteristics: drift, trends, abrupt changes, beginnings and ends of events that are not highlighted by Fourier analysis. Furthermore in transforming from time to frequency domain, time information is lost. When looking at a Fourier transform of a signal, it is impossible to tell when a particular event took place. In those circumstances where signal properties do not change very much over time—i.e. if it is a so-called stationary signal—this drawback is not too heavy, but when, as in the present case, where we are mainly focused on e.g. time information to discover hidden potentially dangerous trends, this approach is not the best option.

It is an object of the present invention to provide a technique which alleviates the above drawback of the prior art.

BRIEF SUMMARY

In a preferred embodiment, the present invention provides a method, computer program product and system, in a predictive monitoring system, the monitoring system monitoring a plurality of system resources, for identifying hidden trends in the behavior of the system resources, the method comprising: collecting metrics of at least one system resource indicative of a behavior of at least one system resource; for each of the at least one system resource, determining a spectrum representative of a time-based signal of the collected metrics; performing a wavelet transform on each of the at least one spectrum; and analyzing the result of the wavelet transform to identify possible linear trends in the behavior of the at least one system resource.

The method of the present invention can help to solve the problem of the prior art by providing a monitoring system which is able to predict and possibly rank potential critical events taking into account how fast the critical situation is being approached. The method is based on a wavelet analysis of the metrics samples, handled as signals, to study their trends. The mathematical analysis of Fourier is not able to discover hidden trends and time variation while the wavelet analysis allows it. This is fundamental to discovering potentially occurring issues.

BRIEF DESCRIPTION OF THE SEVERAL VIEWS OF THE DRAWINGS

Embodiments of the invention will now be described, by way of example only, by reference to the accompanying drawings, in which:

FIG. 1a shows an example of Fourier Transform, while

DETAILED DESCRIPTION

At the basis of the present invention is the Wavelet analysis, which is well known in mathematics. Wavelet analysis is a windowing technique with variable-sized regions. Wavelet analysis allows the use of long time intervals where we want more precise low-frequency information, and shorter regions where we want high-frequency information. One major advantage afforded by wavelets is the ability to perform local analysis, i.e. to analyze a localized area of a larger signal. Considering a sinusoidal signal with a small discontinuity (barely visible), such a signal could easily be generated in the real world, perhaps by a power fluctuation or a noisy switch. A plot of the Fourier coefficients of this signal shows nothing particularly interesting: a flat spectrum with two peaks representing a single frequency. However, a plot of wavelet coefficients clearly shows the exact location in time of the discontinuity. Wavelet analysis is capable of revealing aspects of data which are missed with other signal analysis techniques, aspects like trends, breakdown points, discontinuities in higher derivatives, and self-similarity. Furthermore, because it affords a different view of data than those presented by traditional techniques, wavelet analysis can often compress or de-noise a signal without appreciable degradation.

Figure 1A:
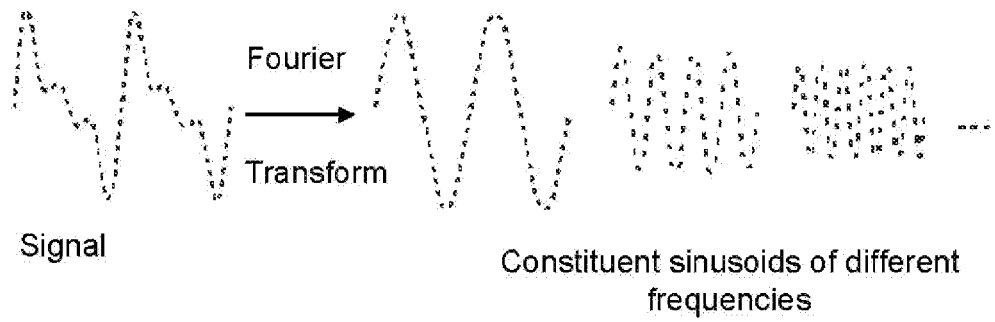

Mathematically, the process of Fourier analysis is represented by the Fourier transform:

$$F(\omega) = \int_{-\infty}^{\infty} f(t)e^{-j\omega t} dt$$

which is the sum over all time of the signal f(t) multiplied by a complex exponential. The results of the transform are the Fourier coefficients $F(\omega)$, which when multiplied by a sinusoid of frequency $\omega$ yield the constituent sinusoidal components of the original signal. Graphically, the process looks like the one shown in FIG. 1a.

Similarly, the continuous wavelet transform (CWT) is defined as the sum over all time of the signal multiplied by scaled, shifted versions of the wavelet function ψ:

$$C(\text{scale, position}) = \int_{-\infty}^{\infty} f(t)\psi(\text{scale, position, } t) dt$$

The results of the CWT are many wavelet coefficients C, which are a function of scale and position.

Figure 1B:
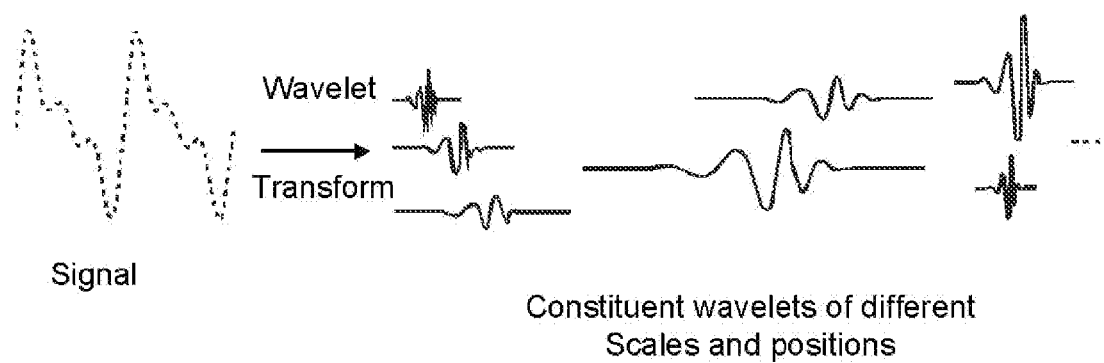
FIG. 1b shows an example of a Continuous Wavelet Transform.

Multiplying each coefficient by the appropriately scaled and shifted wavelet yields the constituent wavelets of the original signal, and we obtain a representation as the one shown in FIG. 1b.

Figure 1C:
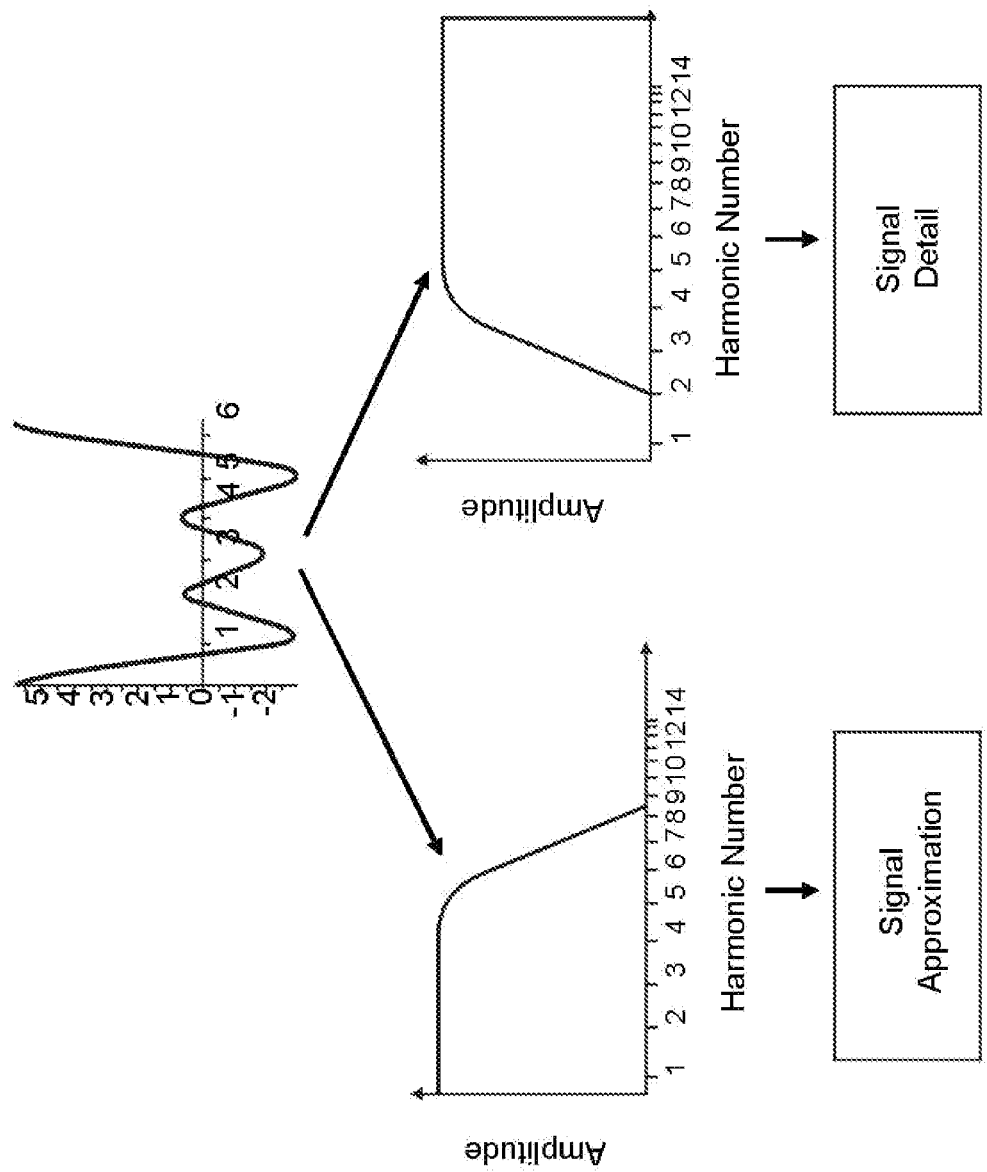
FIGS. 1c and 1d shows an example of a wavelet decomposition process.

Calculating wavelet coefficients at every possible scale requires a considerable amount of work, and it generates a lot of data. If we choose only a subset of scales and positions at which to make our calculations, it turns out that if we choose scales and positions based on powers of two (the so-called dyadic scales and positions) then the analysis would be much more efficient and just as accurate. We obtain such an analysis from the discrete wavelet transform (DWT). For many signals, the low-frequency content is the most important part. It is what gives the signal its identity. The high-frequency content, on the other hand, imparts flavor or nuance. Consider the human voice. If you remove the high-frequency components, the voice sounds different, but you can still tell what is being said. However if you remove enough of the low-frequency components the communication becomes nearly meaningless. In wavelet analysis, we often speak of approximations and details. The approximations are the high-scale, low-frequency components of the signal. The details are the low-scale, high-frequency components. The filtering process, at its most basic level, looks like the one represented in FIG. 1c.

Figure 1D:
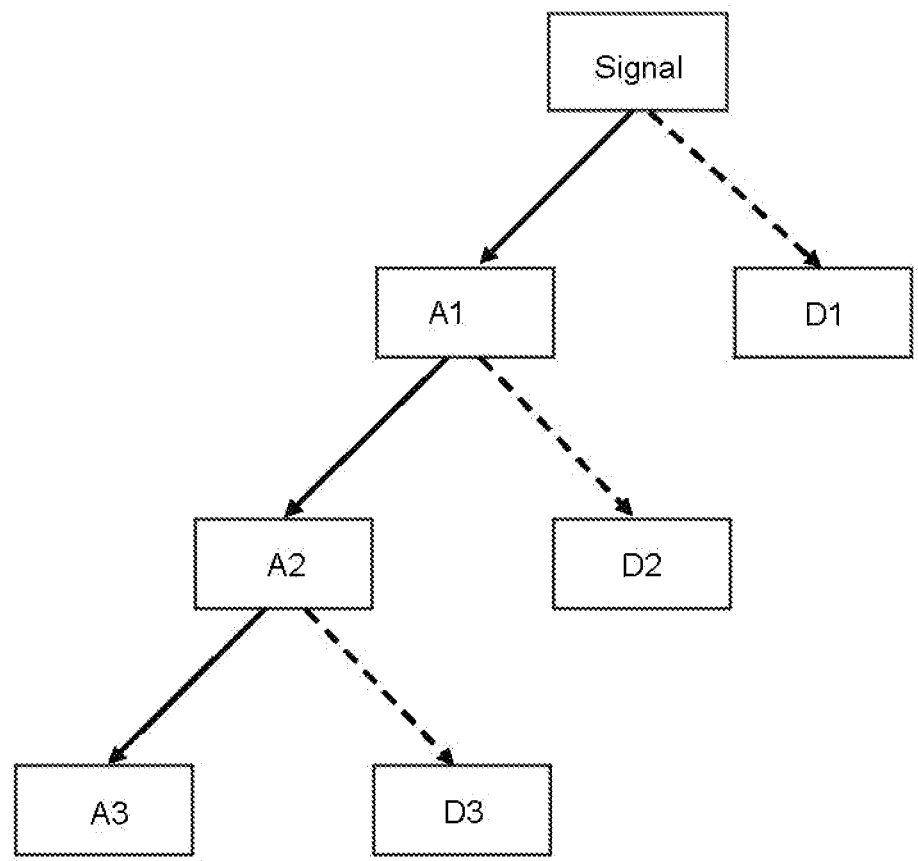

The original signal S passes through two complementary filters and emerges as two signals. The decomposition process can be iterated, with successive approximations being decomposed in turn, so that one signal is broken down into many lower resolution components. This is called the wavelet decomposition tree as shown in FIG. 1d.

Figure 2:
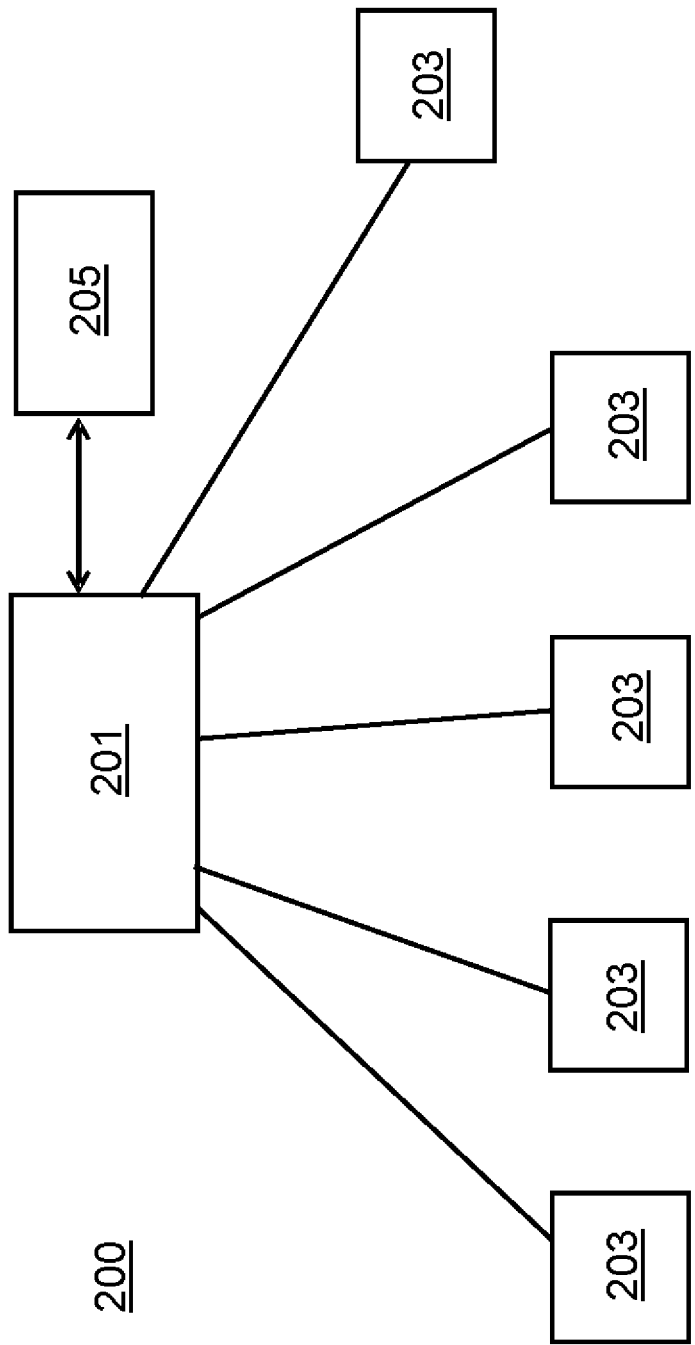
FIG. 2 shows an example of a computer network to which the method of the present invention is applied.

As shown in FIG. 2, the preferred embodiment 200 comprises a monitoring server 201 which is connected to a plurality of monitored resources 203 through a network (e.g. a Local Area Network). Monitored resources can be for example disk usage, CPUs, Memory, Network and Applications; the server 201 can be any kind of Monitoring Server (e.g. IBM Tivoli-Monitoring). Selected performance parameters of the system (such as processing power consumption, memory space usage, bandwidth occupation and the like) are measured by the monitoring server 201. The information so obtained is then interpreted by an analyzer 205 (for example, according to a decision tree) so as to identify any critical condition of the system. For example, the occurrence of a low response time of the system can be inferred when both the processing power consumption and the memory space usage exceeds corresponding threshold values. The analyzer 205 can be a computer separate from the server 201 or it could be integrated in the same computer.

Figure 3:
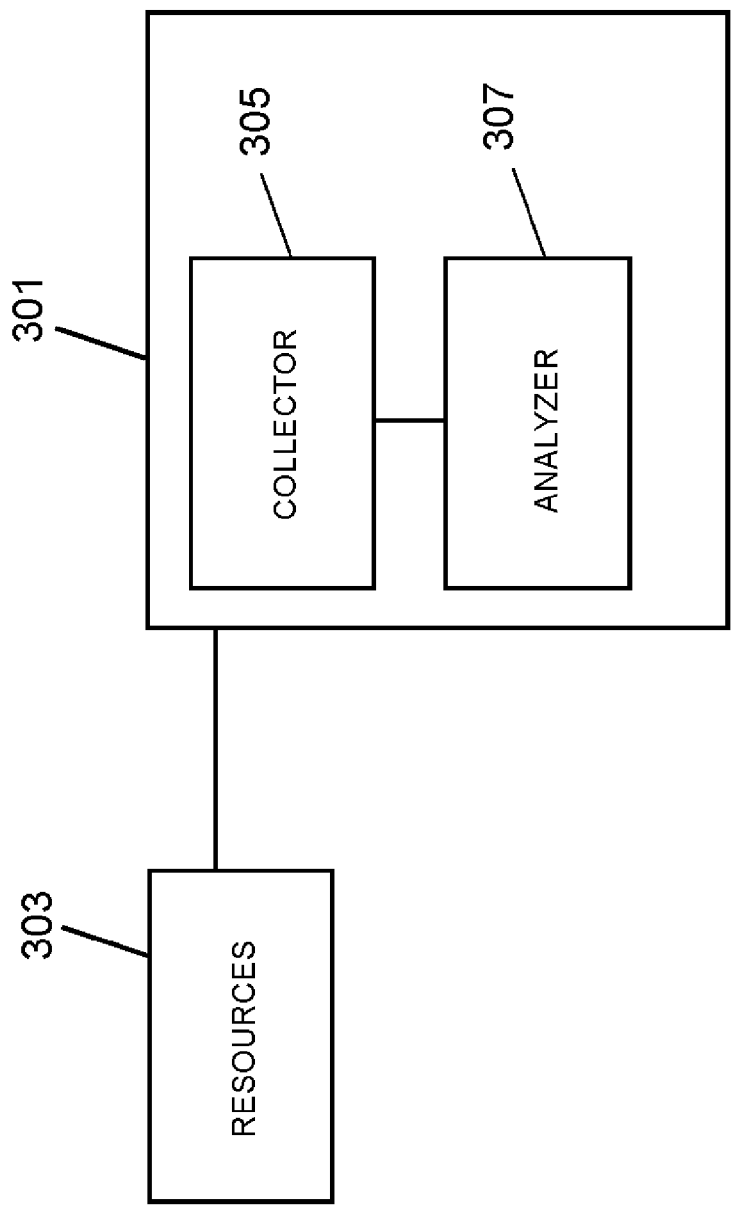
FIG. 3 is a block diagram of a software architecture of a monitoring system of the preferred embodiment of the present invention.

With reference to FIG. 3 the main software components that can be used to practice the method of the invention are illustrated. The information (programs and data) is typically stored on the hard-disk and loaded, at least partially, into the working memory when the programs are running. The programs are initially installed onto the hard-disk from CD-ROMs. Particularly, an agent 301 is used to monitor relevant hardware and/or software resources 303 of the above-described system. For this purpose, the monitoring agent 301 periodically measures state parameters of the system, according to predefined resource models. Each resource model identifies the key state parameters that defile correlated resources 303 in a specific context; for example, the resource model involves the measuring of processing power consumption, a memory space usage, a bandwidth occupation, and a number of concurrent users for controlling the response time of a web application. More in detail, the state parameters are gathered by a collector 305. The state parameters are then supplied to an analyzer module 307, which processes this information according to the present invention. Let's suppose a set of monitoring conditions (C) that describe events with associated severity. Just to start we consider the easiest form:

$$C_i=\text{metric [operator] threshold}$$

Using wavelet analysis it is possible to isolate the hidden trend for each of the metric and, if it is not flat, predict how much time "metric" could take to reach "threshold". This new information could increase or decrease the severity of the conditions, for example $$\text{\% of used Memory} > 90\%$$

has an high severity but if our trend analysis discover that the system will takes 5 years to reach the threshold probably the memory is not an area of concern.

Using the same for each condition $C_i$ it is possible to rank them isolating more critical areas the user should take care with an higher priority. Indeed if we define $M_{Ci}(t)$ the function that return the time "metric" could take to reach "threshold" and become true, we could also define the ranking rule $R_{Ci}$ as:

$$R_{Ci}=S_{Ci}(AT_{Ci}/M_{Ci}(t_o))$$

where $S_{Ci}$ is a function returning a value that is higher depending on the condition severity and $AT_{Ci}$ (action time) is the time required to fix the problem when it happens.

So far we used the easiest condition form:

$$C_i=\text{metric [operator]threshold}$$

but in the real world the monitoring conditions are combinations of more of the above expressions with logical AND and OR. It is not difficult to extend the way to calculate the time "complex" conditions could take to be true:

$$M_{Cj\ AND\ Ci}(t)=\max(M_{Cj}(t_j),M_{Ci}(t_i))$$

$$M_{Cj\ OR\ Ci}(t)=\min(M_{Cj}(t_j),M_{Ci}(t_i))$$

This approach allows awareness of potential problems earlier with respect to standard monitoring solutions, and makes it possible to take the right actions in time, avoiding the risk of reaching critical situations.

As an example, let's suppose we are interested in monitoring the memory usage of a software. With the current monitoring solutions, we can have a data sampling of the memory usage profile with an arbitrary precision, and to monitor that this usage remains within decided thresholds.

Starting from the historical sample of data, a continuous signal can be easily interpolated. Looking at the signal, the variation of memory usage within our working interval can be directly seen, but what can be hidden is a trend of memory leaking that would be invisible to a Fourier analysis. By "trend of memory leaking", we mean there is particular kind of unintentional memory consumption due to failure on releasing memory when no longer needed. This unintentional consumption can be very small if we take into account only the single occurrence, but if it is repeated in time (because the software is supposed to run continuously), it will sooner or later cause a general failure that is unpredictable from a simple monitoring perspective.

Figure 4A:
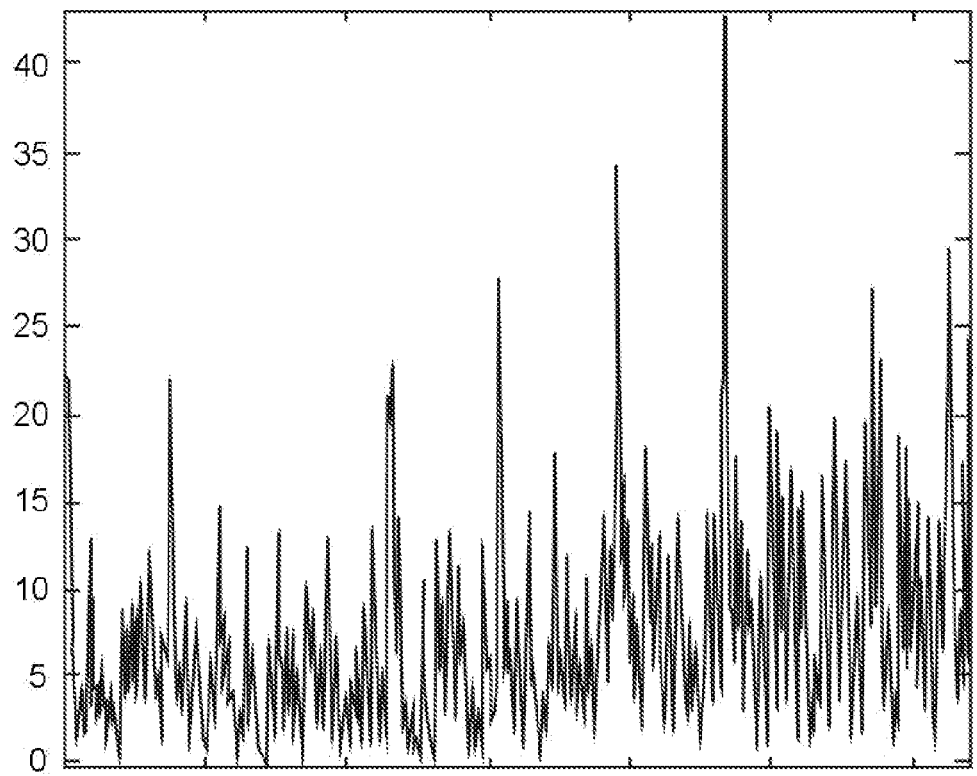
FIGS. 4a and 4b show respectively an example of a signal representing a usage profile obtained by interpolated sampled monitoring data and its representation by means of a Continuous Wavelet Transform.
Figure 4B:
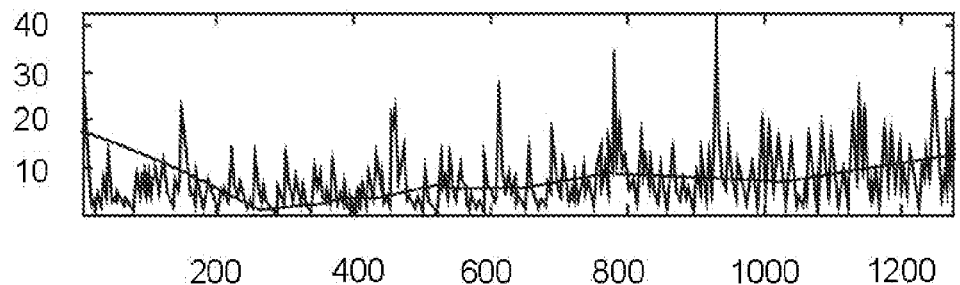

The signal in FIG. 4a is a memory usage profile signal interpolated from sampled monitoring data. In the period of time under investigation, the software seems to work fine because the memory usage is under control within the required thresholds (for example between 0% and 50%). Looking at FIG. 4b, this is the wavelet transform of this signal. A clear linear trend of memory leaking is highlighted that will cause a system failure in a time that depends on the trend velocity itself (we can see it from the approximation at level 8, obtained using the wavelet family Daubechies of order 3). In this case we focused on memory, but our approach can be ex-tended to a monitoring dashboard for a generic system that implements this wavelet based approach for study of hidden dangerous trends in the monitored metrics.

Figure 5:
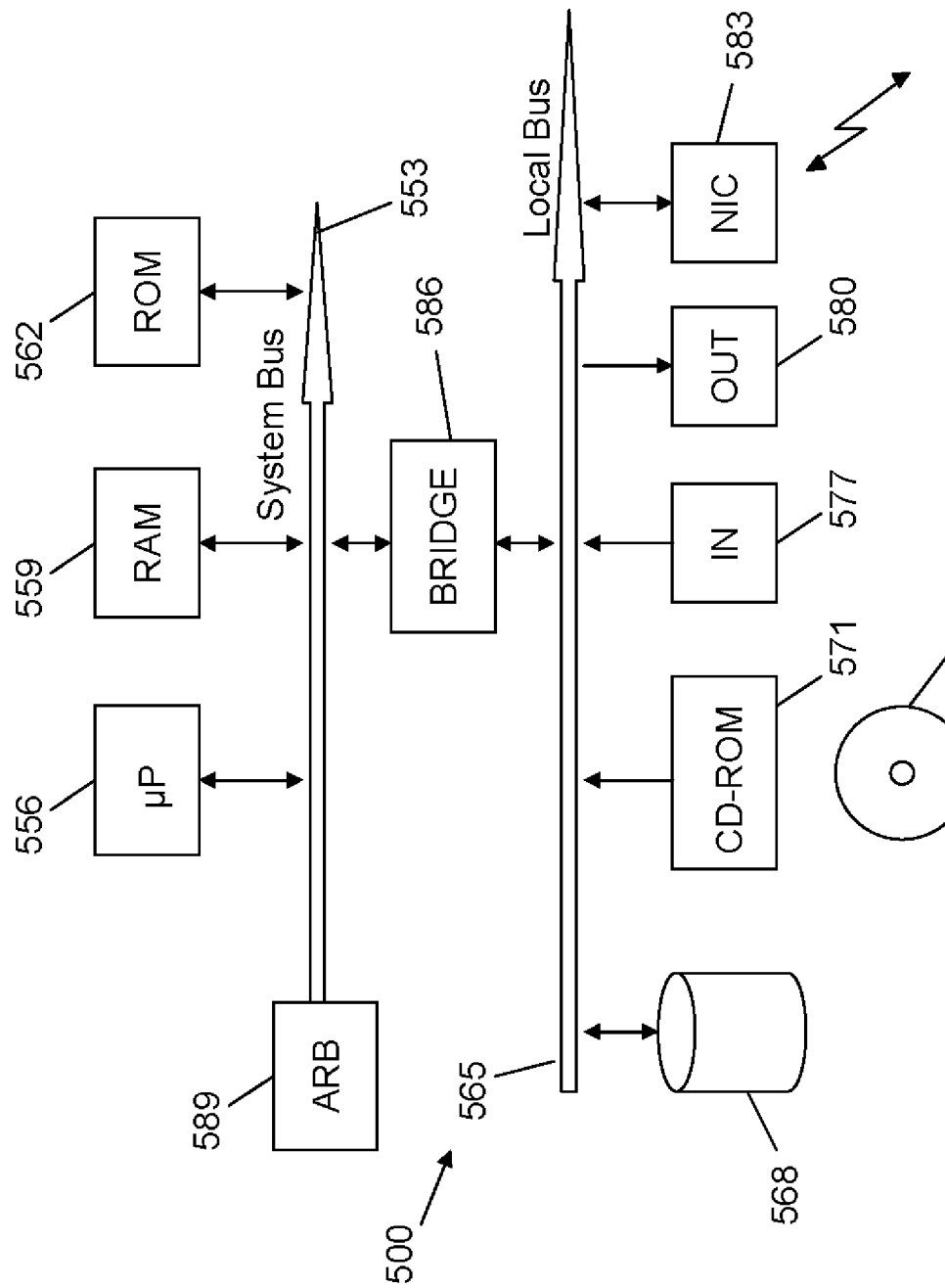
FIG. 5 is a diagram of a general computer system adapted to support the method of the preferred embodiment.

With reference to FIG. 5, a generic computer of the system (e.g. computer, server, system resource, analyzer, remote server) is denoted with 550. The computer 550 is formed by several units that are connected in parallel to a system bus 553. In detail, one or more microprocessors 556 control operation of the computer 550; a RAM 559 is directly used as a working memory by the microprocessors 556, and a ROM 562 stores basic code for a bootstrap of the computer 550. Peripheral units are clustered around a local bus 565 (by means of respective interfaces). Particularly, a mass memory consists of a hard-disk 568 and a drive 571 for reading CD-ROMs 574. Moreover, the computer 550 includes input devices 577 (for example, a keyboard and a mouse), and output devices 580 (for example, a monitor and a printer). A Network Interface Card 583 is used to connect the computer 550 to the network. A bridge unit 586 interfaces the system bus 553 with the local bus 565. Each microprocessor 556 and the bridge unit 586 can operate as master agents requesting an access to the system bus 553 for transmitting information. An arbiter 589 manages the granting of the access with mutual exclusion to the system bus 553. Similar considerations apply if the system has a different topology, or it is based on other networks. Alternatively, the computers have a different structure, include equivalent units, or consist of other data processing entities (such as PDAs, mobile phones, and the like).

Figure 6:
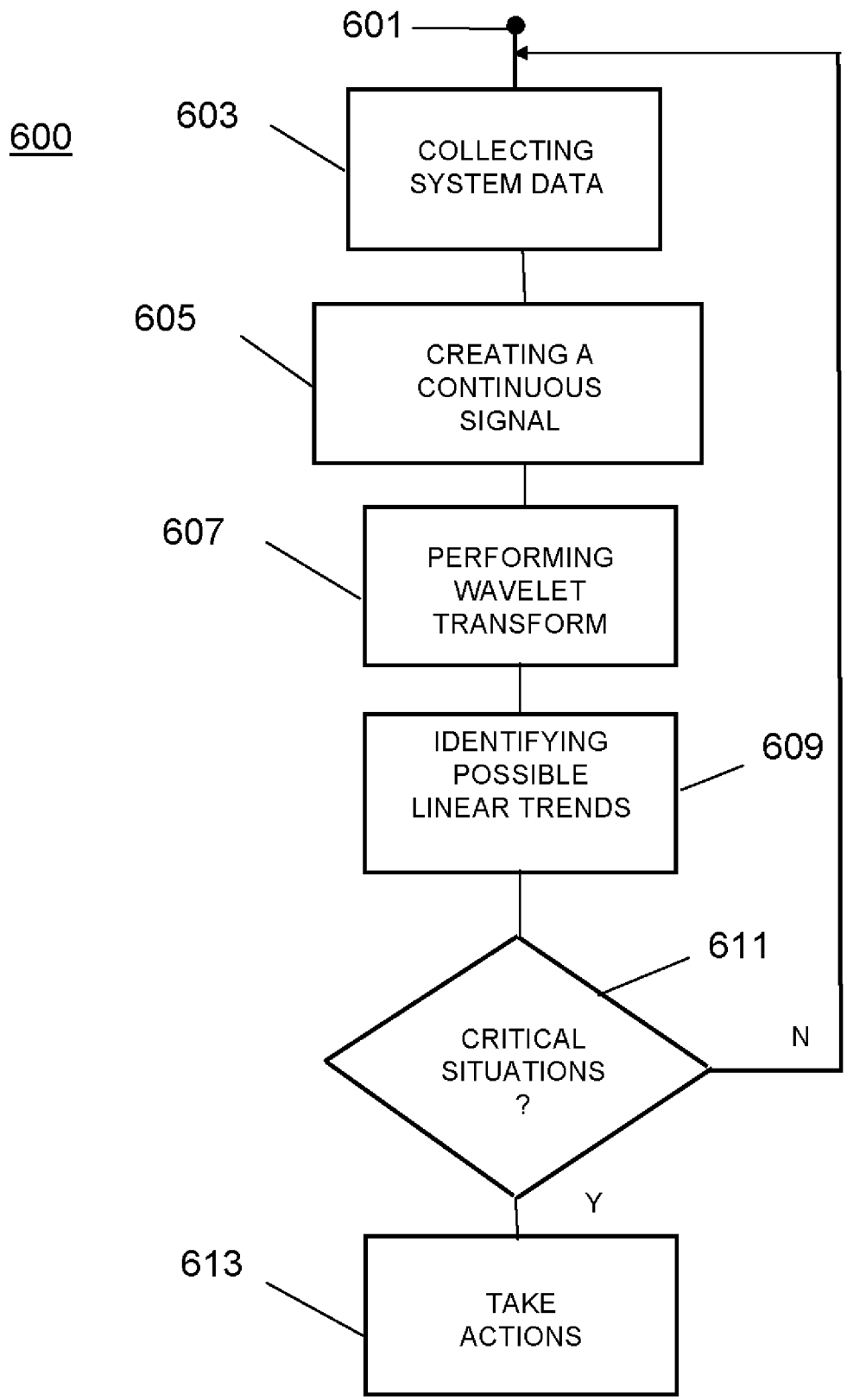
FIG. 6 shows a flowchart representing a method according to a preferred embodiment of the present invention.

FIG. 6 schematically shows the method according to a preferred embodiment of the present invention (600). The process starts at step 601 and goes to step 603 where the system data are collected as explained above with reference to FIG. 3. A continuous signal is then built by e.g. interpolation of such data (step 605). Such signal is transformed according to a Continuous Wavelet Transform (CWT) at step 607. The result is analyzed in order to identify possible linear trends (step 609). If a linear trend is detected (decision step 611) recovery actions can be implemented (613), otherwise control goes back to the collecting step 603. The activity of analyzing the transformed signal (609) can be either carried out by a system engineer or system administrator or even automatically performed by means of a dedicated tool. Several commercially available tools could be used for such activity, e.g. Matlab® of MathWorks™ or Mathematica® of Wolfram Research™.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice. For example, similar considerations apply if the computers have different structure or include equivalent units; in any case, it is possible to replace the computers with any code execution entity (such as a PDA, a mobile phone, and the like). Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type. In any case, the solution according to the present invention lends itself to be carried out with a hardware structure (for example, integrated in a chip of semiconductor material), or with a combination of software and hardware.

What is claimed is:

1. A computer implemented method for monitoring a plurality of hardware or software system resources for identifying hidden trends in the behavior of the system resources, the method comprising:
   collecting metrics of at least one system resource indicative of the behavior of at least one system resource;
   for each of the at least one system resource, determining a spectrum representative of a time-based signal of the collected metrics;
   performing a wavelet transform on each of the at least one spectrum;
   analyzing the result of the wavelet transform to identify possible linear trends in the behavior of the at least one system resource;
   assigning to each identified linear trend a severity value indicative of a criticality of the related behavior wherein the criticality of behaviors comprises an indication of how fast a predetermined threshold of the related system resource will be reached; and
   ranking the severity value with respect to at least one other severity value to identify an order in which to address the behavior of the at least one system resource.

2. The method of claim 1, wherein the determining the spectrum representative of the time-based signal of the collected metrics comprises:
   interpolating the collected metrics for building a continuous graph.

3. The method of claim 1, further comprising:
   for each of the at least one system resource, reading a critical threshold related to each metric.

4. The method of claim 3 wherein the analyzing the result of the wavelet transform to identify the possible linear trends in the behavior of the at least one system resource comprises:
   estimating, by extrapolation of the linear trends, the time required by the system resource metrics to reach related critical thresholds.

5. The method of claim 1 further comprising:
   logically combining severity values of a plurality of identified linear trends to identify hidden trends in the behavior of the system resources.

6. The method of claim 1 wherein ranking the severity value with respect to the at least one other severity value to identify the order in which to address the behavior of the at least one system resource comprises:
   ranking the severity value according to a repair time required to repair the behavior of the at least one system resource.

7. The method of claim 6 wherein ranking the severity value according to the repair time required to repair the behavior of the at least one system resource comprises:
   ranking the severity value according the repair time and how fast a predetermined threshold of the related system resource will be reached.

8. A computer program product for monitoring a plurality of hardware or software system resources for identifying hidden trends in the behavior of the system resources, the computer program product comprising:
   a computer readable memory device having computer readable program code embodied therewith, the computer readable program code comprising:
   computer readable program code configured to:
   collect metrics of at least one system resource indicative of the behavior of at least one system resource;
   for each of the at least one system resource, determine a spectrum representative of a time-based signal of the collected metrics;
   perform a wavelet transform on each of the at least one spectrum;
   analyze the result of the wavelet transform to identify possible linear trends in the behavior of the at least one system resource;
   assign to each identified linear trend a severity value indicative of a criticality of the related behavior wherein the criticality of behaviors comprises an indication of how fast a predetermined threshold of the related system resource will be reached; and
   rank the severity value with respect to at least one other severity value to identify an order in which to address the behavior of the at least one system resource.

9. The computer program product of claim 8, wherein the computer readable program code configured to determine the spectrum representative of the time-based signal of the collected metrics is further configured to: interpolate the collected metrics for building a continuous graph.

10. The computer program product of claim 8, wherein the computer readable program code is further configured to:
    for each of the at least one system resource, read a critical threshold related to each metric.

11. The computer program product of claim 10, wherein the computer readable program code configured to analyze the result of the wavelet transform to identify the possible linear trends in the behavior of the at least one system resource is further configured to: estimate, by extrapolation of the linear trends, the time required by the system resource metrics to reach related critical thresholds.

12. The computer program product of claim 8, wherein the computer readable program code is further configured to:
    logically combine severity values of a plurality of identified linear trends to identify hidden trends in the behavior of the system resources.

13. The computer program product of claim 8, wherein the computer readable program code configured to rank the severity value with respect to the at least one other severity value to identify the order in which to address the behavior of the at least one system resource is further configured to:
    rank the severity value according to a repair time required to repair the behavior of the at least one system resource.

14. The computer program product of claim 13, wherein the computer readable program code configured to rank the severity value according to the repair time required to repair the behavior of the at least one system resource is further configured to:
  rank the severity value according the repair time and how fast a predetermined threshold of the related system resource will be reached.

15. A system, comprising:
  a plurality of system resources, comprising hardware or software system resources; and
  a computer for monitoring the plurality of system resources, wherein the computer:
    collects metrics of at least one system resource indicative of the behavior of at least one system resource;
    for each of the at least one system resource, determines a spectrum representative of a time-based signal of the collected metrics;
    performs a wavelet transform on each of the at least one spectrum;
    analyzes the result of the wavelet transform to identify possible linear trends in the behavior of the at least one system resource;
    assigns to each identified linear trend a severity value indicative of a criticality of the related behavior wherein the criticality of behaviors comprises an indication of how fast a predetermined threshold of the related system resource will be reached; and
    ranks the severity value with respect to at least one other severity value to identify an order in which to address the behavior of the at least one system resource.

16. The system of claim 15, wherein when the computer determines the spectrum representative of the time-based signal of the collected metrics the computer:
  interpolates the collected metrics for building a continuous graph.

17. The system of claim 15, wherein the computer further:
  for each of the at least one system resource, reads a critical threshold related to each metric.

18. The system of claim 17, wherein when the computer analyzes the result of the wavelet transform to identify the possible linear trends in the behavior of the at least one system resource the computer: estimates, by extrapolation of the linear trends, the time required by the system resource metrics to reach related critical thresholds.

19. The system of claim 15, wherein the computer further:
  logically combines severity values of a plurality of identified linear trends to identify hidden trends in the behavior of the system resources.

20. The system of claim 15, wherein when the computer ranks the severity value with respect to the at least one other severity value to identify the order in which to address the behavior of the at least one system resource, the computer:
  ranks the severity value according to a repair time required to repair the behavior of the at least one system resource and how fast a predetermined threshold of the related system resource will be reached.

* * * * *